(12) United States Patent  (10) Patent No.: US 8,917,038 B2
Fukuoka et al.                  (45) Date of Patent:     Dec. 23, 2014

(54) MOTOR CONTROL DEVICE

(75) Inventors: Takayuki Fukuoka, Aichi (JP); Yoshiki Yamagishi, Aichi (JP); Satoshi Kido, Aichi (JP); Yasutaka Shirota, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 152 days.

(21) Appl. No.: 13/569,774

(22) Filed: Aug. 8, 2012

(65)           Prior Publication Data

US 2013/0038251 A1      Feb. 14, 2013

(30)      Foreign Application Priority Data

Aug. 8, 2011   (JP) ................................. 2011-172682

(51) Int. Cl.
*H02P 7/00*   (2006.01)
*H02P 7/06*   (2006.01)
*H02H 9/04*   (2006.01)

(52) U.S. Cl.
CPC .. *H02P 7/06* (2013.01); *H02P 7/00* (2013.01); *H02H 9/04* (2013.01)
USPC ........... 318/139; 318/430; 318/379; 318/375; 318/362

(58) Field of Classification Search
CPC ................................. H02P 29/024; H02P 7/06
USPC .......................... 318/139, 430, 379, 375, 362
See application file for complete search history.

(56)          References Cited

U.S. PATENT DOCUMENTS 5,889,376 A  *  3/1999  Takatsuka et al. ............ 318/434
6,332,506 B1 *  12/2001  Kifuku ........................... 180/443
6,563,284 B2 *  5/2003  Teutsch et al. ................ 318/599
7,180,257 B1 *  2/2007  Schneider et al. ....... 318/400.09
2011/0068721 A1   3/2011  Bochen

FOREIGN PATENT DOCUMENTS

| JP | H06-245564 A | 9/1994 |
| JP | H07-32627 A | 2/1995 |
| JP | H07-081588 A | 3/1995 |
| JP | 8111902 A | 4/1996 |
| JP | H08-265964 A | 10/1996 |
| JP | 11041703 A | 2/1999 |
| JP | 2007-092787 A | 4/2007 |
| JP | 2011072179 A | 4/2011 |

OTHER PUBLICATIONS

English Patent Abstract of JP 11-041703, Publication Date: Feb. 12, 1999 (1 Page).
English Patent Abstract of JP 08-111902, Publication Date: Apr. 30, 1996 (1 Page).
Office Action dated Aug. 27, 2014 in corresponding Japanese Application No. 2011-172682 (with translation) (9 pages).

* cited by examiner

*Primary Examiner* — David S Luo
(74) *Attorney, Agent, or Firm* — Osha Liang LLP

(57)         ABSTRACT

A motor control device has a drive circuit that drives an electric motor with a battery as a power supply, a switch element that is provided between the battery and the drive circuit, the switch element supplying a current from the battery to the drive circuit when being turned on, the switch element cutting off the current from the battery to the drive circuit when being turned off, a rotation speed detector that detects a rotation speed of the electric motor, and a controller that operates the drive circuit to control the electric motor. The controller turns on the switch element when the rotation speed of the electric motor, which is detected by the rotation speed detector, is greater than or equal to a first predetermined value during stopping of the control of the electric motor.

4 Claims, 6 Drawing Sheets

<MOTOR CONTROL STATE>

ELECTRIC REAR-HATCH OPENING AND CLOSING SYSTEM 100

<MOTOR UNCONTROLLED, CIRCUIT PROTECTION STATE>

<MOTOR UNCONTROLLED, CIRCUIT PROTECTION STOPPED STATE>

MOTOR CONTROL DEVICE

TECHNICAL FIELD

The present invention relates to a motor control device that controls an electric motor, which is driven with a battery as a power supply.

RELATED ART

For example, Japanese Unexamined Patent Publication No. 2011-72179 discloses a spindle type drive unit that automatically opens and closes a rear hatch of a vehicle. In the drive unit, a spindle is taken in and out from a main body pipe by a rotation of a built-in electric motor (motor), thereby opening and closing the rear hatch.

For example, the electric motor is controlled by a circuit disclosed in Japanese Unexamined Patent Publication Nos. 11-41703 and 8-111902. For example, a switch element disclosed in Japanese Unexamined Patent Publication Nos. 11-41703 and 8-111902 is provided between a power supply and a driving circuit of the electric motor. The switch element is turned on and off to supply and cut off a current from the power supply to the drive circuit.

When the supply of the current is cut off so as not to control the electric motor, sometimes the electric motor rotates by external force by manually opening and closing the rear hatch. In such cases, the electric motor acts as an electric generator to generate an induced voltage. When the induced voltage is applied to the drive circuit to increase a voltage at the drive circuit, a risk of destroying the drive circuit is generated due to a damage of a semiconductor element in the drive circuit.

In Japanese Unexamined Patent Publication No. 11-41703, the electric motor and the switch element (relay) are connected to each other through a cut-off preventing circuit and a diode. Therefore, a control current by the induced voltage of the electric motor is supplied to the switch element to close a contact of the switch element, and a voltage generated by the electric motor is regulated to a power supply voltage.

In Japanese Unexamined Patent Publication No. 8-111902, the diode is connected in parallel with the switch element (contact, such as a contactor) to form a closed circuit including the diode, the drive circuit, and another parallel load. Therefore, the electric power generated by the electric motor is released through the closed circuit.

However, in the device disclosed in Japanese Unexamined Patent Publication Nos. 11-41703 and 8-111902, it is necessary to newly provide another component, such as the cut-off preventing circuit and the diode. In the case where the power supply and the drive circuit are connected without interposing the switch element therebetween, the driving circuit is instantaneously destroyed when the power supply (battery) is reversely connected while a positive electrode is mistaken for a negative electrode.

SUMMARY

One or more embodiments of the present invention provides a motor control device that can prevent the destruction of the driving circuit due to the induced voltage generated by the electric motor when the electric motor rotates by external force during the stopping of the control of the electric motor.

In accordance with one or more embodiments of the present invention, a motor control device includes: a drive circuit that drives an electric motor with a battery as a power supply; a switch element that is provided between the battery and the drive circuit, the switch element supplying a current from the battery to the drive circuit when being turned on, the switch element cutting off the current from the battery to the drive circuit when being turned off; a rotation speed detector that detects a rotation speed of the electric motor; and a controller that operates the drive circuit to control the electric motor. The controller turns on the switch element when the rotation speed of the electric motor, which is detected by the rotation speed detector, is greater than or equal to a first predetermined value during stopping of the control of the electric motor.

Accordingly, even if the electric motor rotates by the external force to generate the induced voltage during the stopping of the control of the electric motor, another component is not newly provided, but a current route from the electric motor to the battery through the drive circuit is formed by turning on the switch element. Therefore, the induced voltage generated by the electric motor is discharged to the battery through the drive circuit and the switch element, the voltage at the drive circuit is equalized to the voltage at the battery, and the destruction of the drive circuit can be prevented.

In the motor control device according to one or more embodiments of the present invention, the controller may turn off the switch element when the rotation speed of the electric motor, which is detected by the rotation speed detector, is less than or equal to a second predetermined value during the stopping of the control of the electric motor.

The controller may turn on the switch element when controlling the electric motor, and the controller may turn off the switch element when stopping the control of the electric motor.

According to one or more embodiments of the invention, the motor control device, which can prevent the destruction of the driving circuit due to the induced voltage generated by the electric motor when the electric motor rotates by the external force during the stopping of the control of the electric motor, can be provided.

DETAILED DESCRIPTION

Hereinafter, embodiments of the present invention will be described with reference to the drawings. In the following drawings, the identical or equivalent portion is designated by the identical numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
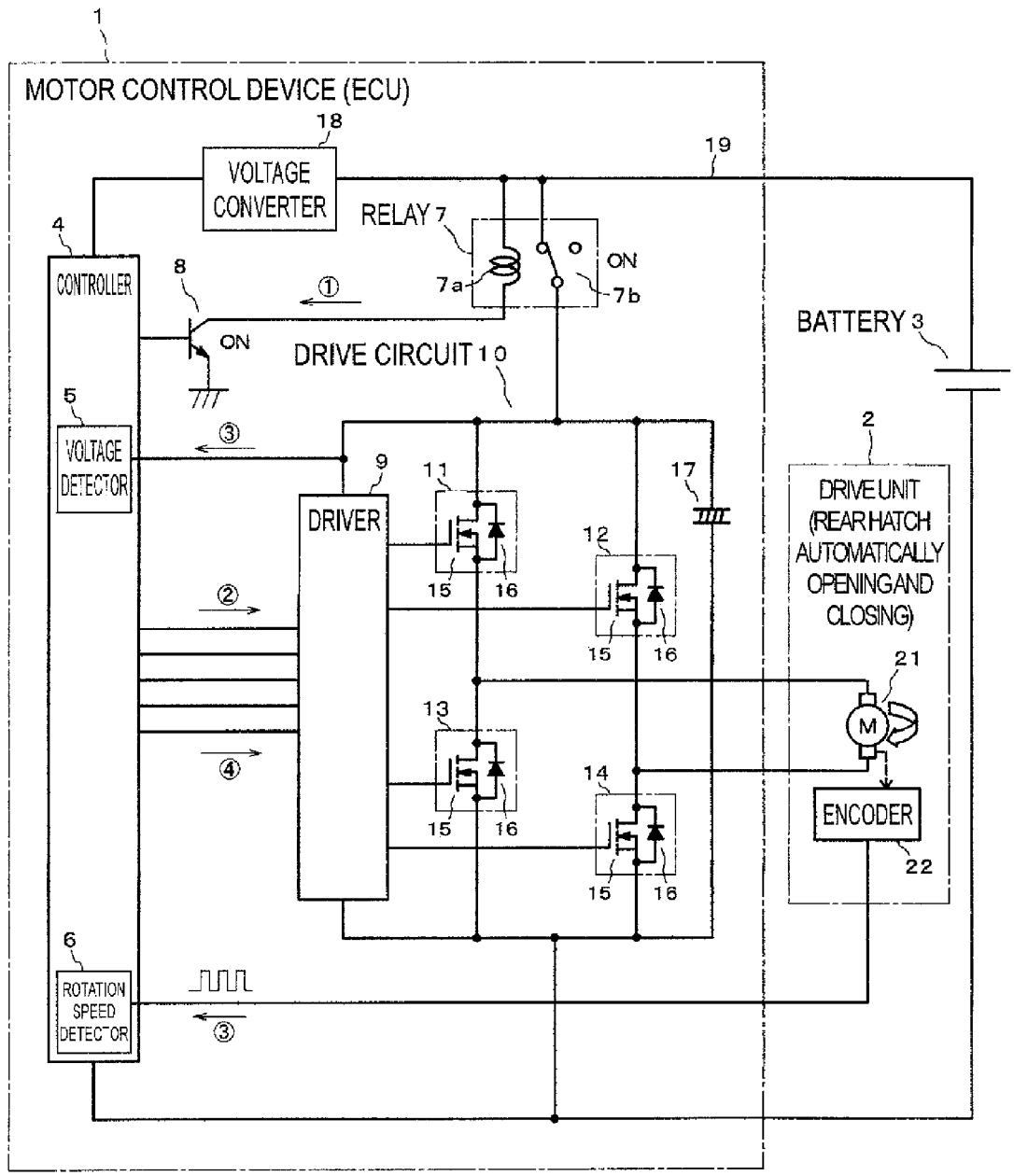
FIG. 1 is a view illustrating a configuration of a motor control device according to one or more embodiments of the invention.

FIG. 1 is a view illustrating a configuration of a motor control device 1 according to one or more embodiments of the invention. The motor control device 1 is an ECU (Electronic Control Unit) that is used in an electric rear-hatch opening and closing system 100 of an automobile. A drive unit 2 is a spindle type drive unit that opens and closes a rear hatch of the automobile.

A motor 21 is a drive source of the drive unit 2, and includes a DC motor. The motor 21 is an example of the "electric motor" according to one or more embodiments of the invention. A two-phase encoder 22 is provided in two phases to output a pulse signal according to rotation states in normal and reverse directions of the motor 21.

A controller 4 is constructed by a microcomputer. The controller 4 is connected to a positive electrode of a battery 3 through a voltage converter 18. The controller 4 is also connected to a negative electrode of the battery 3. The voltage converter 18 converts a voltage (for example, 12 V) at the battery 3 into a voltage (for example, 5 V) for the controller 4. The controller 4 can always operate because the controller 4 is always energized by the battery 3.

A drive circuit 10 is a bridge circuit that drives the motor 21 by supplying a current to the motor 21 with the battery 3 as a power supply. Each of switching units 11 to 14 of the drive circuit 10 includes a MOSFET (Metal Oxide Semiconductor Field Effect Transistor) 15 and a free wheeling diode 16 that is connected in reversely parallel with the MOSFET 15. A smoothing capacitor 17 is connected in parallel with the drive circuit 10 in order to reduce a ripple.

A driver 9 switches between on and off of the MOSFET 15 of each of the switching units 11 to 14. The controller 4 performs an on-off operation of the MOSFET 15 of each of the switching units 11 to 14 through the driver 9. Therefore, the motor 21 rotates normally and reversely.

A relay 7 is connected to a power-supply line 19 of the battery 3 for the purpose of protection against reverse connection. One end of a coil 7a of the relay 7 is connected to the battery 3 through the power-supply line 19. The other end of the coil 7a is connected to a collector of a transistor 8. A base of the transistor 8 is connected to the controller 4, and an emitter is grounded. One end of a contact 7b of the relay 7 is connected to the battery 3 through the power-supply line 19. The other end of the contact 7b is connected to the driver 9 and the drive circuit 10.

The controller 4 provides a signal turning on and off the transistor 8 to the base of the transistor 8. The controller 4 turns on the transistor 8 to energize the coil 7a of the relay 7. The contact 7b of the relay 7 is on (closed) by a magnetic field generated by the coil 7a, and the current is supplied from the battery 3 to the drive circuit 10. The controller 4 turns off the transistor 8 so as not to energize the coil 7a of the relay 7. The magnetic field is not generated by the coil 7a, and the contact 7b of the relay 7 is off (opened) to cut off the current from the battery 3 to the drive circuit 10.

The contact 7b of the relay 7 is off in attaching or exchanging the battery 3. Therefore, the driving circuit 10 is not destroyed even if the battery 3 is reversely connected while a positive electrode is mistaken for a negative electrode. That is, the relay 7 protects the driving circuit 10 from the reverse connection of the battery 3. The relay 7 is an example of the "switch element" according to one or more embodiments of the invention.

A voltage detector 5 and a rotation speed detector 6 are provided in the controller 4. The voltage detector 5 detects a voltage applied to the drive circuit 10. The rotation speed detector 6 detects rotation speeds in the normal and reverse direction of the motor 21 based on the pulse signal output from the encoder 22.

When the motor 21 is controlled, namely, when the rear hatch is automatically opened and closed, the controller 4 turns on the transistor 8 to energize the coil 7a of the relay 7, thereby turning on the contact 7b (circled number 1 in FIG. 1). Therefore, a power supply voltage is supplied from the battery 3 to the driver 9 and the drive circuit 10. The controller 4 drives the drive circuit 10 through the driver 9 to perform the on-off operations of the switching units 11 to 14 (circled number 2 in FIG. 1). As a result, the current is supplied from the battery 3 to the motor 21 through the drive circuit 10 to start the rotation of the motor 21. Therefore, a spindle mechanism of the drive unit 2 operates to automatically open and close the rear hatch of the automobile.

After the rotation of the motor 21, the controller 4 issues a necessary command to the driver 9 to control the motor 21 based on the voltage at the drive circuit 10, which is detected by the voltage detector 5, and the rotation speed of the motor 21, which is detected by the rotation speed detector 6 (circled numbers 3 and 4 in FIG. 1). The current supplied from the drive circuit 10 to the motor 21 is controlled by a PWM (Pulse Width Modulation) signal provided from the driver 9. Therefore, the rotation speed of the motor 21 is controlled to adjust an opening and closing speed of the rear hatch.

When the control of the motor 21 is stopped, namely, when the rear hatch is stopped, the controller 4 turns off the transistor 8 to turn off the contact 7b of the relay 7. Therefore, an electric power of the battery 3 is not unnecessarily consumed, but useless power consumption can be reduced.

An induced voltage is generated in the motor 21, when the motor 21 rotates by external force because the rear hatch is manually opened and closed during stopping of the control of the motor 21. At this point, when the contact 7b of the relay 7 remains off, the induced voltage of the motor 21 is applied to the drive circuit 10, and the voltage at the drive circuit 10 is increased with increasing rotation speed of the motor 21. When the voltage at the drive circuit 10 is greater than a withstand voltage of the drive circuit 10, possibly the driving circuit 10 is destroyed due to a damage of a semiconductor element such as the MOSFET 15 or the free wheeling diode 16, which constitutes the switching units 11 to 14 (see FIG. 5).

Therefore, the motor control device 1 performs a circuit protection operation to protect the driving circuit 10 from the induced voltage of the motor 21. The detailed circuit protection operation will be described below.

Figure 2:
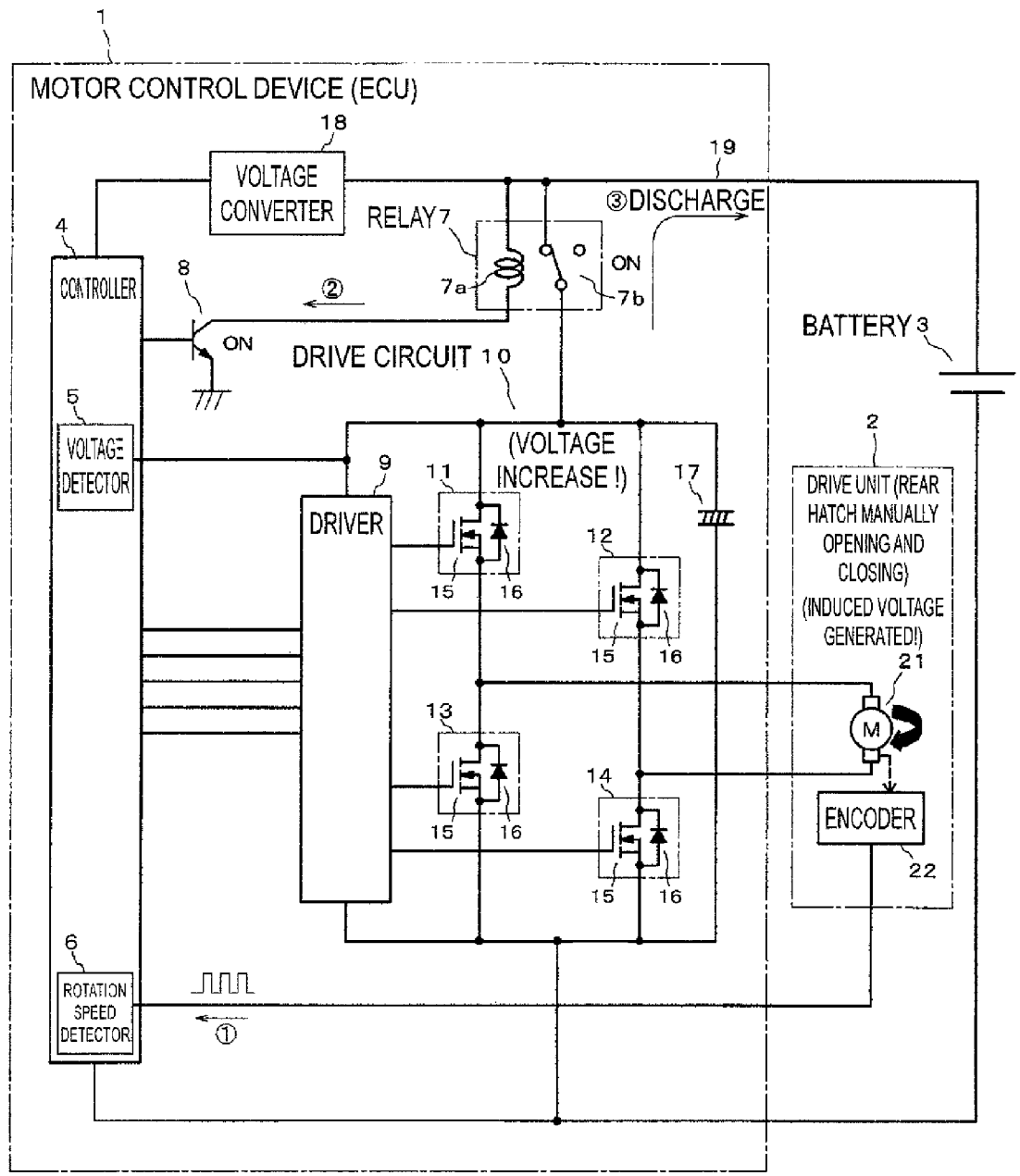
FIG. 2 is a view illustrating a circuit protection state of the motor control device.
Figure 3:
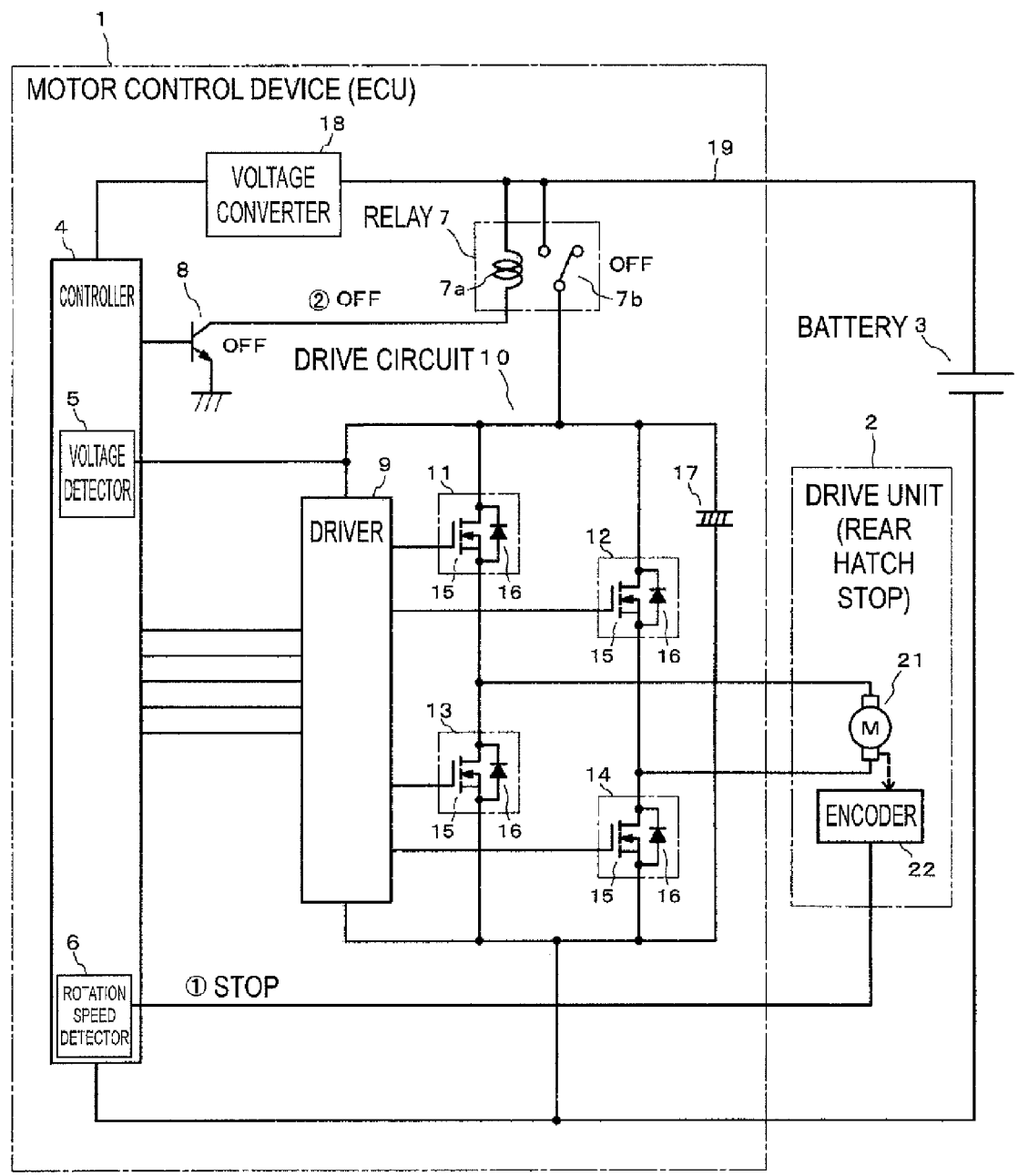
FIG. 3 is a view illustrating a circuit protection stopped state of the motor control device.
Figure 4:
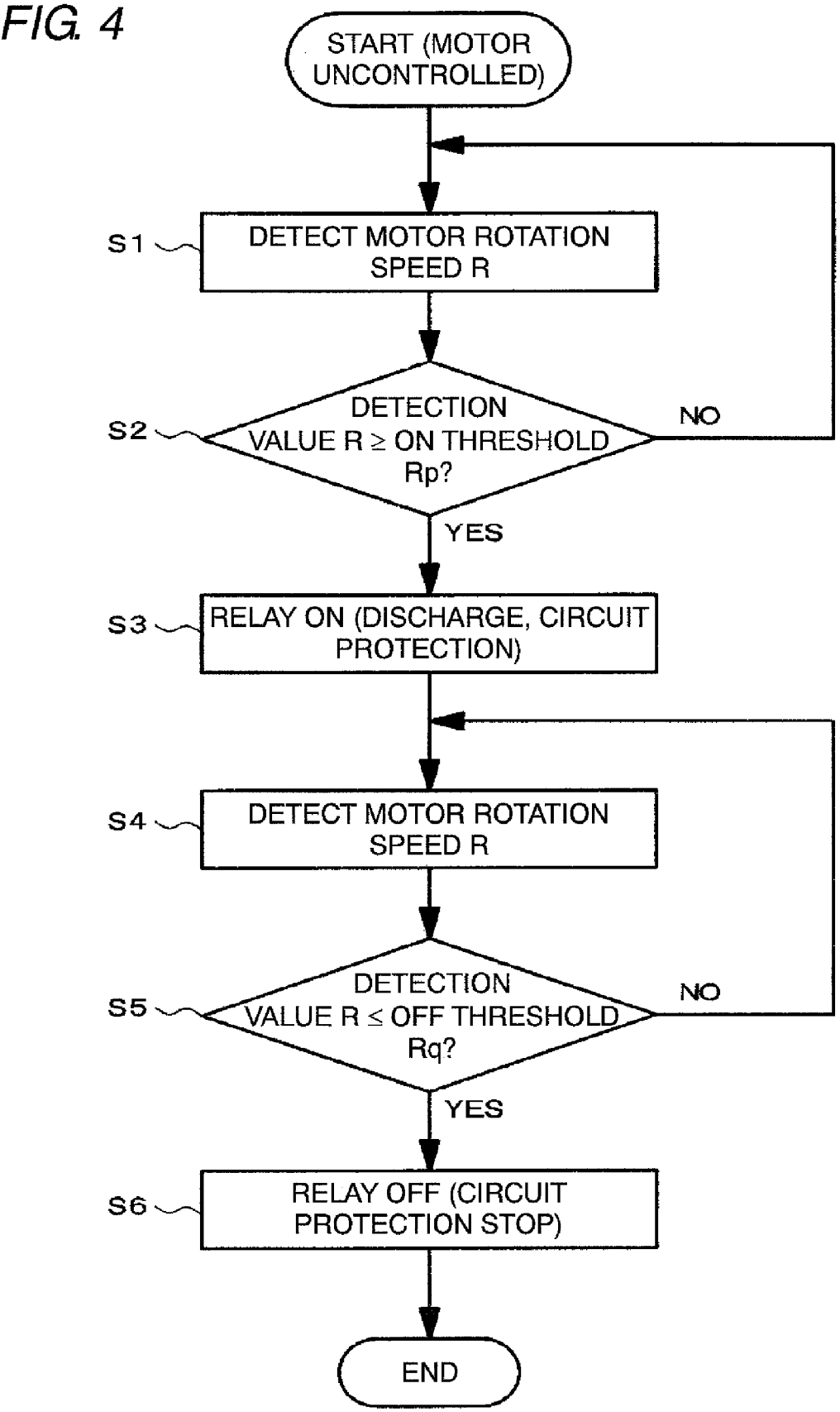
FIG. 4 is a flowchart illustrating a circuit protection operation of the motor control device.
Figure 5:
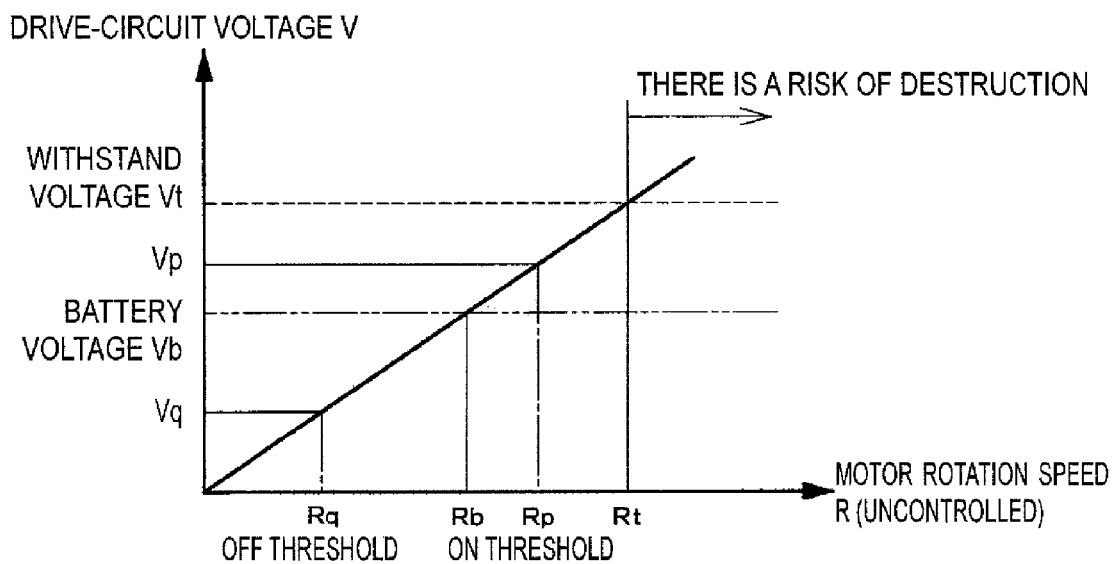
FIG. 5 is a view illustrating an example of changes in drive circuit voltage of the motor control device and motor rotation speed.
Figure 6:
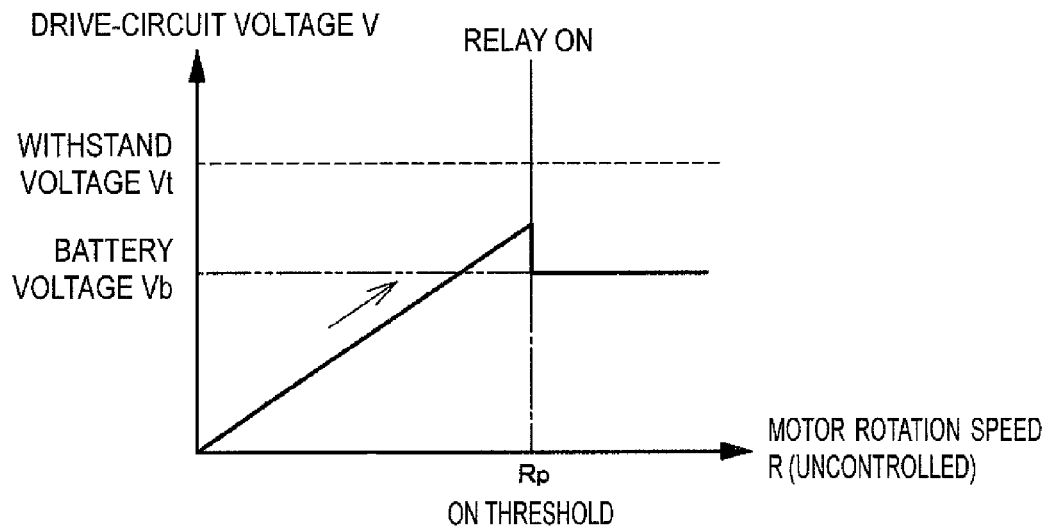
FIG. 6 is a view illustrating an example of the changes in drive circuit voltage of the motor control device and motor rotation speed.
Figure 7:
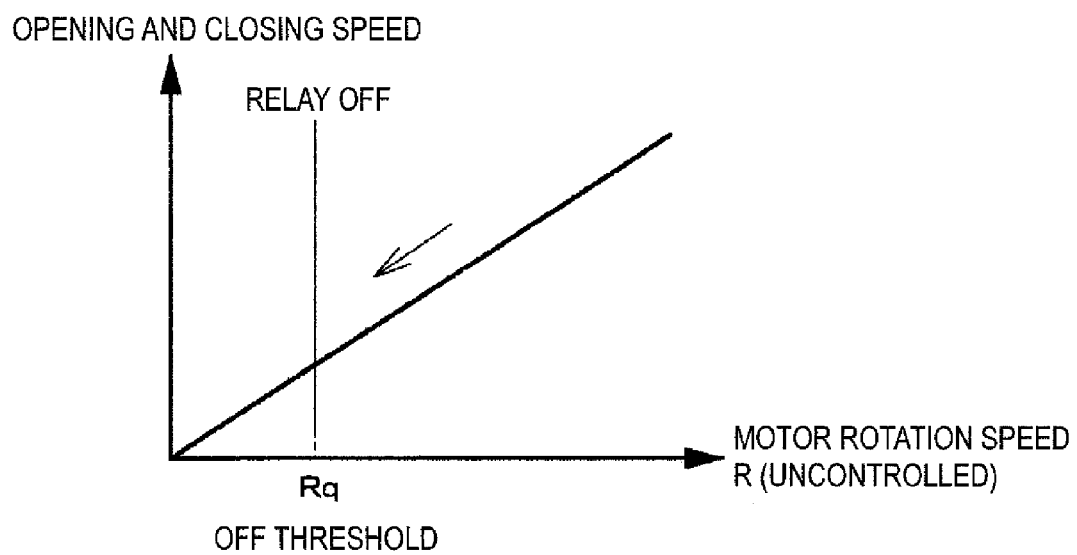
FIG. 7 is a view illustrating an example of the changes in drive circuit voltage of the motor control device and motor rotation speed.

FIG. 2 is a view illustrating a circuit protection state of the motor control device 1. FIG. 3 is a view illustrating a circuit protection stopped state of the motor control device 1. FIG. 4 is a flowchart illustrating the circuit protection operation of the motor control device 1. FIGS. 5 to 7 are views illustrating examples of changes in voltage V at the drive circuit 10 of the motor control device 1 and rotation speed R of the motor 21.

During the stopping of the control of the motor 21 (in uncontrolled), using the rotation speed detector 6, the controller 4 detects the rotation speed R of the motor 21 based on the output from the encoder 22 (circled number 1 in FIG. 2, and Step S1 in FIG. 4). The controller 4 determines whether the rotation speed R by the rotation speed detector 6 is greater than or equal to a predetermined ON threshold Rp (Step S2).

The ON threshold Rp corresponds to the "first predetermined value" according to one or more embodiments of the invention.

As illustrated in FIG. 5, the ON threshold Rp is set less than a rotation speed Rt of the motor 21 at the time the voltage V at the driving circuit 10 reaches the withstand voltage Vt (Rp<Rt). The ON threshold Rp may be set greater than the rotation speed Rb of the motor 21 at the time the voltage V at the drive circuit 10 reaches the voltage Vb at the battery 3 (Rb<Rp).

At the time the rotation speed R of the motor 21 reaches the ON threshold Rp, a voltage Vp at the driving circuit 10 is less than the withstand voltage Vt of the driving circuit 10 (Vp<Vt).

Whether the detection value R by the rotation speed detector 6 is less than the ON threshold Rp (NO in Step S2 in FIG. 4), the controller 4 detects the rotation speed R of the motor 21 again using the rotation speed detector 6 (Step S1).

For example, in the case where the rear hatch is manually opened and closed, the motor 21 rotates by the external force, and the rotation speed R of the motor 21 is increased as illustrated in FIGS. 5 and 6. The voltage V at the driving circuit 10 is also increased, because the induced voltage generated by the motor 21 is increased with increasing rotation speed R of the motor 21.

Therefore, when the detection value R by the rotation speed detector 6 is greater than or equal to the ON threshold Rp (YES in Step S2 in FIG. 4), the controller 4 turns on the transistor 8 to turn on the contact 7b of the relay 7 (Step S3 in FIG. 4).

Therefore, because the motor 21 is connected to the battery 3 through the free wheeling diode 16 of the driving circuit 10 and the contact 7b, the induced voltage of the motor 21 is discharged to the battery 3 (circled number 3 in FIG. 2). As illustrated in FIG. 6, the voltage V at the drive circuit 10 is equalized to the voltage Vb at the battery 3 to protect the drive circuit 10.

Then the controller 4 detects the rotation speed R of the motor 21 using the rotation speed detector 6 (Step S4 in FIG. 4), The controller 4 determines whether the detection value R by the rotation speed detector 6 is less than or equal to a predetermined OFF threshold Rq (Step S5). The OFF threshold Rq corresponds to the "second predetermined value" according to one or more embodiments of the invention.

As illustrated in FIG. 5, the OFF threshold Rq is set less than a rotation speed Rt of the motor 21 at the time the voltage V at the drive circuit 10 reaches the withstand voltage Vt, and the OFF threshold Rq is set less than a rotation speed Rb of the motor 21 at the time the voltage V at the drive circuit 10 reaches a voltage Vb at the battery 3 (Rq<Rb<Rt). The OFF threshold Rq is set less than the ON threshold Rp (Rq<Rp).

At the time the rotation speed R of the motor 21 reaches the OFF threshold Rq, a voltage Vq at the driving circuit 10 a becomes less than the voltage Vb at the battery 3 (Vq<Vb).

When the detection value R by the rotation speed detector 6 is greater than the OFF threshold Rq (NO in Step S5 in FIG. 4), the controller 4 detects the rotation speed R of the motor 21 using the rotation speed detector 6 again (Step S4).

For example, when the rear hatch is not manually opened and closed, the rotation speed R of the motor 21 is decreased with decreasing opening and closing speed of the rear hatch as illustrated in FIG. 7. The induced voltage of the motor 21 is also decreased.

Therefore, when the detection value R by the rotation speed detector 6 is less than or equal to the OFF threshold Rq (YES in Step S5 in FIG. 4), the controller 4 turns off the transistor 8 to turn off the contact 7b of the relay 7 (circled number 2 in FIG. 3, and Step S6 in FIG. 4). Therefore, the motor 21 and the drive circuit 10 are separated from the battery 3 to stop the protection of the drive circuit 10.

Then, when the rear hatch stops motor 21, the motor 21 stops, and the output of the pulse signal from the encoder 22 also stops (circled number 1 in FIG. 3). The motor 21 does not generate the induced voltage. Because the transistor 8 and the contact 7b of the relay 7 are off (circled number 2 in FIG. 3), the current is not passed from the battery 3 to the drive circuit 10.

According to one or more of the above embodiments, even if the motor 21 rotates by the external force to generate the induced voltage during the stopping of the control of the motor 21, the contact 7b of the relay 7 is turned on when the rotation speed R of the motor 21 is greater than or equal to the ON threshold Rp. Even if a new component is not separately provided, a current route from the motor 21 to the battery 3 through the driving circuit 10 is formed by turning on the contact 7b. Therefore, the induced voltage of the motor 21 is discharged to the battery 3 through the drive circuit 10 and the contact 7b, and the voltage V at the drive circuit 10 is equalized to the voltage Vb at the battery 3. Accordingly, the destruction of the drive circuit 10 due to the induced voltage of the motor 21 can be prevented.

In one or more of the above embodiments, the contact 7b of the relay 7 is turned off when the rotation speed R of the motor 21 is less than or equal to the OFF threshold Rq during the stopping of the control of the motor 21. Therefore, the motor 21 and the drive circuit 10 are not energized by the battery 3, but the useless consumption of the electric power of the battery 3 can be prevented.

In addition to the above embodiments, various embodiments can be adopted in the invention. In one or more of the above embodiments, the relay 7 is provided as the switch element by way of example. However, the invention is not limited to the relay 7. Other switch elements, such as a transistor and a reed switch, may be used instead of the relay 7. In the switching units 11 to 14 of the drive circuit 10, another power transistor or a thyristor may be used instead of the MOSFET 15.

In one or more of the above embodiments, by way of example, the invention is applied to the motor control device (ECU) 1 that controls the motor 21 used in the electric rear-hatch opening and closing system 100. However, one or more embodiments of the invention can be applied to a motor control device that controls the electric motor used in other use applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor control device comprising:
   a drive circuit that drives an electric motor with a battery as a power supply;
   a switch element that is provided between the battery and the drive circuit, the switch element supplying a current from the battery to the drive circuit when being turned on, the switch element cutting off the current from the battery to the drive circuit when being turned off;
   a rotation speed detector that detects a rotation speed of the electric motor; and
   a controller that operates the drive circuit to control the electric motor, wherein the controller turns on the switch element when the rotation speed of the electric motor generated by an external force acting on the electric motor, which is detected by the rotation speed detector, is greater than or equal to a first predetermined value, when the switching element is off during stopping of the control of the electric motor.

2. The motor control device according to claim 1, wherein the controller turns off the switch element when the rotation speed of the electric motor, which is detected by the rotation speed detector, is less than or equal to a second predetermined value during the stopping of the control of the electric motor.

3. The motor control device according to claim 2, wherein the controller turns on the switch element when controlling the electric motor, and turns off the switch element when stopping the control of the electric motor.

4. The motor control device according to claim 1, wherein the controller turns on the switch element when controlling the electric motor, and turns off the switch element when stopping the control of the electric motor.

\* \* \* \* \*